D. C. HENRY.
SYSTEM OF DIFFERENTIAL MAGNETIC TRANSMISSION.
APPLICATION FILED JAN. 14, 1918. RENEWED DEC. 6, 1919.
1,333,415.
Patented Mar. 9, 1920.
2 SHEETS—SHEET 2.
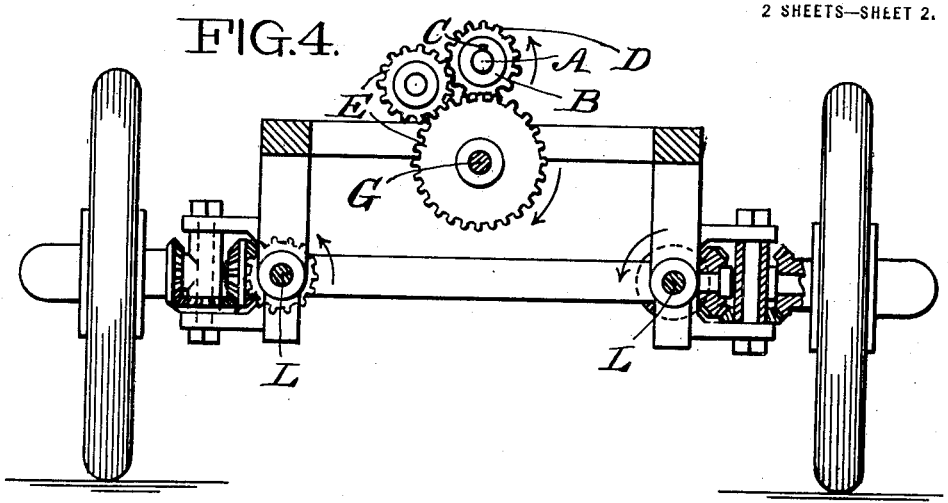
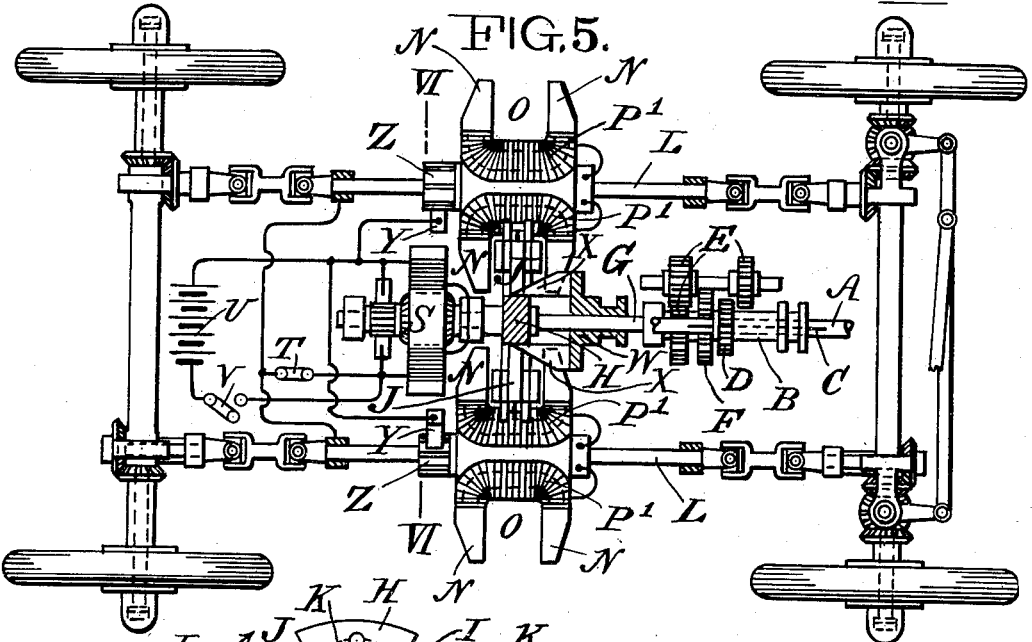
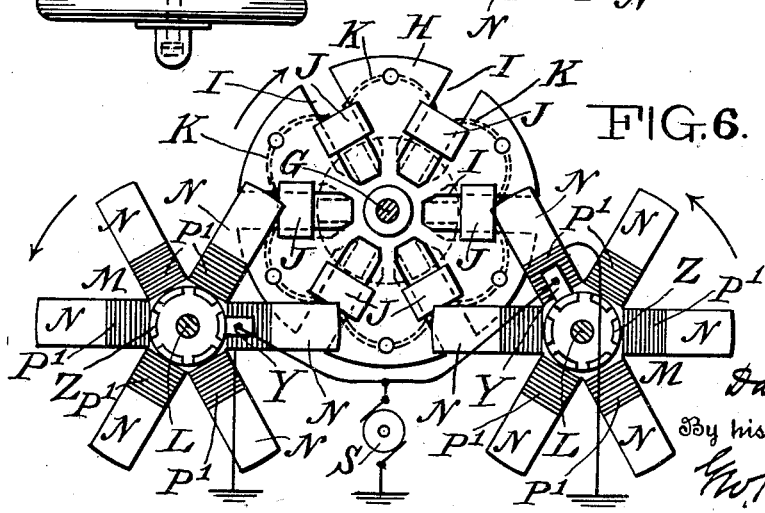
Inventor
David Carl Henry
By his Attorney

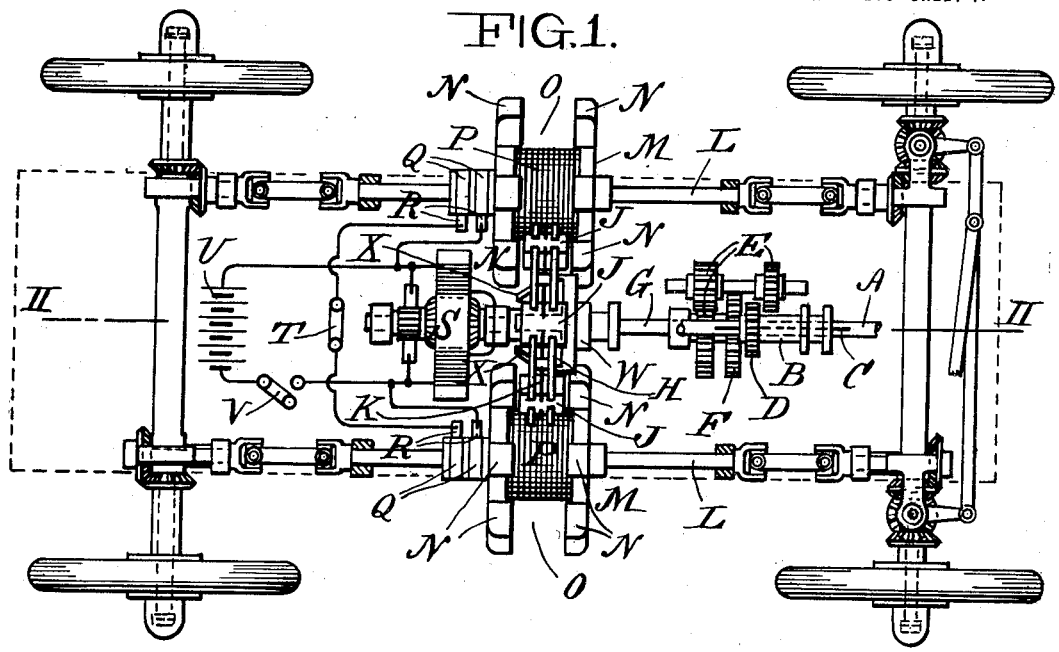

UNITED STATES PATENT OFFICE.

DAVID CARL HENRY, OF NEW YORK, N. Y.

SYSTEM OF DIFFERENTIAL MAGNETIC TRANSMISSION.

1,333,415.  Specification of Letters Patent.  Patented Mar. 9, 1920.

Application filed January 14, 1918, Serial No. 211,780.  Renewed December 6, 1919.  Serial No. 343,107.

*To all whom it may concern:*

Be it known that I, DAVID CARL HENRY, a citizen of the United States, residing at New York, in the county and State of New York, have invented certain new and useful Improvements in Systems of Differential Magnetic Transmission, of which the following is a specification.

In a prior application, Serial No. 604,062 filed Jan. 23, 1911, I have described a system of differential magnetic transmission, wherein the rear axle of the vehicle is made continuous, the rear wheels mounted to revolve upon the axle, and the power of the engine transmitted to the wheels by a plurality of rotating fields energized from the power, a plurality of rotating armatures inductively energized from the fields, and transmission means between the rotating armatures and the wheels, and regulation of speed effected by means of a device for varying the energy of the fields, the purpose of the construction being: First, to do away with the usual pivoted axle and differential gearing interposed between the power and the rear axle; second, to take advantage of the slip between the rotating fields and armature, thus obtaining a differential action; and third, to control the slip by varying the excitation of the rotating fields and thus control the speed of the vehicle.

My present application describes a construction which embodies the main features of the construction set forth in my prior application, and in addition thereto describes means for transmitting the power to both the rear and the front wheels; and also means by reason of which a change of speed between the driving member of the source of power and the driven member or members, will result in a corresponding change in the torque effect obtained.

The accompanying drawings will serve to illustrate my invention, in which, Figure 1 is a plan view of an automobile chassis.

Fig. 2 is a longitudinal section taken on the line II—II of Fig. 1.

Fig. 3 is a transverse section taken on the line III—III of Fig. 2.

Fig. 4 is a transverse section taken on the line IV—IV of Fig. 2.

Fig. 5 is a plan view corresponding to Fig. 1 and shows a modification.

Fig. 6 is a transverse section approximately on the line VI—VI of Fig. 5, and showing the armature slides on the rotating disk in a different position from that shown in Fig. 3.

Referring to the drawings: A indicates a power shaft, which may be connected to and driven by any source of power (not shown). Mounted upon the shaft A is a sliding sleeve B, in engagement with the shaft by means of a spline C located on the shaft A. Forming part of the sleeve B is a gear wheel D, which may be thrown into engagement, as desired, through the movement of the sleeve B, with either the reverse gearing E or the direct gearing F, either of these gearings E or F acting to communicate a fixed rotating speed to the shaft G. Secured to the shaft G is a disk H formed of non-magnetic material and having formed therein a series of radial slots I. Mounted in each of the slots I, is a slidable member J formed of magnetic material. Arranged over the slidable members J near the periphery of the disk H, are springs K, which act to hold the slidable members in the position shown in Fig. 6, *i. e.*, in the position nearest to the center of motion of the disk H.

Mounted on shafts L on each side of the disk H, and parallel with the shaft G, are spiders M provided with arms N. The arms N have formed in their periphery, grooves O, the arms being sufficiently long and the grooves sufficiently wide to include the major portion of the periphery of the disk H and the slidable members J. Mounted on the spiders M are coils P, connected through their terminals to rings Q on which are brushes R connected to the terminals of a source of electric energy S, shown as a dynamo electric machine, the moving member of which is mounted on shaft G which is driven from the source of power through shaft A.

T indicates a switch adapted to close the circuit from the dynamo machine through the coils P. U indicates a battery, which may be closed through switch V to primarily excite the fields of the dynamo electric machine and the coils P. Mounted on shaft G is a sliding sleeve W, provided with a cone X, the right hand end of which takes under the slidable members J. When the cone is moved to the left by means of a lever (not shown) the slidable members J are moved into the position shown in Fig. 3, and conversely, when the cone is moved to the right, the slidable members J, under the action of the springs K, return to the position shown in Fig. 6.

The operation of my improved device is as follows: Power is transmitted through shaft A to the disk H. Rotation of the disk H causes the slidable members J to revolve within the grooves O of the spiders M, which are magnetized by the coils P. Rotation of the disk H, owing to the magnetic relation existing between the slidable members J on the disk H, which serve as armatures, and the arms N of the spiders M, which serve as fields, causes the spiders to follow the disk and to drive the shafts L, which are connected by suitable mechanism to the driving wheels. Assuming now that the slidable members J are in the position shown in Fig. 6, the movement of the cone X to the left will force the slidable members J toward the periphery of the disk H and thereby proportionally change the gear ratio between the driving member and the driven members. As the slidable members J are moved toward the periphery of the disk, the speed of the driving shafts L will be increased and the torque decreased, and conversely, when the slidable members J are moved inward, the speed of the shafts will be decreased and the torque increased. This arrangement permits of slow speed and high torque at the start, and high speed and low torque when the vehicle is under way.

In the modification shown in Figs. 5 and 6, instead of providing the coil P for energizing all of the arms N of each spider M, each pair of arms straddling the periphery of disk H and the slidable members J may be provided with coils P′ connected through the brushes Y upon commutators Z on shafts L, and in such manner that each of the arms N of the spiders M will be energized at the moment of approaching a slidable member J, and lose its magnetization at a predetermined point governed by the position of the brush Y upon the commutator Z.

I wish it understood that the drawings of this application are in a sense diagrammatic, and merely intended for illustration. The drawings show my device as applied to an automobile. Manifestly the device could be used upon an aeroplane or other apparatus where it is desired to transmit power of a prime mover without the interposition of gearing between the driving and the driven shafts, or in other words, where there is no direct mechanical connection between the driving and the driven shafts.

Having thus described my invention, I claim:

1. In a system of magnetic transmission, the combination of a driving member, carrying a plurality of radially adjustable members; and a plurality of driven members designed to coact and act as a differential.

2. In a system of magnetic transmission, the combination of a driving member, carrying a plurality of radially adjustable members; and a plurality of driven members adapted to embrace the periphery of the driving member and designed to coact and act as a differential.

3. In a system of magnetic transmission, the combination of a rotating driving member, a series of adjustable slidable members mounted on said member, a plurality of driven members adapted to embrace the periphery of the driving member and the slidable members thereon, and designed to coact and act as a differential.

4. In a system of magnetic transmission, the combination of a rotating driving member, a plurality of adjustable slidable members mounted on said member, means for giving movement to the slidable members, a plurality of driven members adapted to embrace the periphery of the driving member and the slidable members, and designed to coact and act as a differential.

5. In a system of magnetic transmission, the combination of a rotating driving member, having formed therein radial slots, a plurality of slidable members located in said slots, means for moving said slidable members, a plurality of driven members adapted to embrace the periphery of the driving member and the slidable members, and designed to coact and act as a differential.

6. In a system of magnetic transmission, the combination of a rotating driving member, a plurality of driven members adapted to embrace the periphery of the driving member, and means forming part of the rotating driving member for changing the gear ratio between the driving member and the driven members.

7. In a system of magnetic transmission, the combination of a rotating driving member, a plurality of rotating electrically energized driven members, means for changing the gear ratio between the driving and the driven members, and means for changing the magnetization of the driven members.

8. In a system of magnetic transmission designed to operate through an air gap without actual contact, the combination of a power shaft, a non-magnetic disk mounted upon the shaft, a series of slidable members mounted upon the disk, means for moving the slidable members radially, inwardly and outwardly along said disk, and a plurality of electrically energized driven members whose lines of force pass through said slidable members.

9. In a system of magnetic transmission designed to operate through an air gap, the combination of a power shaft, a non-magnetic disk, having radial slots, mounted upon the power shaft, a series of slidable members mounted in said disk, means for moving said slidable members along said slots, a plurality of electrically energized rotary driven members adapted to embrace and follow the rotating movement of the driving member, together with mechanical means adapted to vary the position of the slidable members in relation to the periphery of the disk and its center.

10. In a system of magnetic transmission, the combination of a power shaft, a rotating disk mounted on the shaft, a series of metallic slidable members mounted upon the disk, a plurality of electrically energized driven members adapted to embrace the periphery of the disk and the slidable members thereon, shafts driven by said driven members and wheels driven by said shafts.

11. In a system of magnetic transmission, the combination of a power shaft, reversing mechanism mounted thereon, a rotating disk, a series of slidable members carried by said disk, a plurality of electrically energized driven members having arms adapted to embrace the periphery of the disk and slidable members, shafts connected to said driven members, wheels driven by said shafts, means for altering the magnetic intensity of the driven members, and means for varying the torque exerted by the driving member through the driven members.

12. In a system of magnetic transmission, the combination of a single power shaft, a single rotating disk mounted on said shaft, a plurality of movable members mounted upon the disk, a plurality of electrically energized driven members each mounted on a separate shaft and said members each adapted to embrace the periphery of the rotating disk with the slidable members thereon, means for moving the slidable members radially on the disk, and means for changing the magnetization of the driven members.

In testimony whereof, I affix my signature.

DAVID CARL HENRY.